US010532778B2

(12) United States Patent
DeMonte et al.

(10) Patent No.: US 10,532,778 B2
(45) Date of Patent: Jan. 14, 2020

(54) INTERLOCKING WELDLESS CONNECTION FOR METAL COMPONENTS

(71) Applicants: Walter Peter DeMonte, Windsor (CA); Timothy Paul DeMonte, Toronto (CA); Sheri Lyn LeBlanc, Windsor (CA)

(72) Inventors: Walter Peter DeMonte, Windsor (CA); Timothy Paul DeMonte, Toronto (CA); Sheri Lyn LeBlanc, Windsor (CA)

( * ) Notice: Subject to any disclaimer, the term of this patent is extended or adjusted under 35 U.S.C. 154(b) by 0 days.

(21) Appl. No.: 16/101,817

(22) Filed: Aug. 13, 2018

(65) Prior Publication Data

US 2019/0047637 A1    Feb. 14, 2019

Related U.S. Application Data

(60) Provisional application No. 62/544,317, filed on Aug. 11, 2017.

(51) Int. Cl.
| | |
|---|---|
| *B62D 27/06* | (2006.01) |
| *B62D 25/20* | (2006.01) |
| *B62D 33/02* | (2006.01) |
| *B62D 21/09* | (2006.01) |
| *B62D 21/12* | (2006.01) |
| *B62D 21/20* | (2006.01) |
| *B62D 24/02* | (2006.01) |

(52) U.S. Cl.
CPC .......... *B62D 27/065* (2013.01); *B62D 21/09* (2013.01); *B62D 21/12* (2013.01); *B62D 21/20* (2013.01); *B62D 24/02* (2013.01); *B62D 25/2054* (2013.01); *B62D 33/02* (2013.01)

(58) Field of Classification Search
CPC .. B62D 27/065; B62D 25/2054; B62D 33/02; B62D 33/077; B62D 53/06; B62D 53/061; B62D 53/067; B62D 63/06; B62D 65/02; B62D 21/09; B62D 21/12; B62D 21/20; B62D 24/00; B62D 24/02; F16B 5/0008; F16B 5/0084; F16B 5/0088; F16B 5/0092; F16B 5/07
USPC ............................. 296/35.1, 35.3, 36, 184.1
See application file for complete search history.

(56) References Cited

U.S. PATENT DOCUMENTS

| | | | | |
|---|---|---|---|---|
| 4,091,888 | A | * | 5/1978 | Yamanaka ................ B60P 7/16 188/268 |
| 4,204,712 | A | * | 5/1980 | Maricic .............. B62D 25/2054 105/419 |

(Continued)

*Primary Examiner* — Gregory A Blankenship
(74) *Attorney, Agent, or Firm* — Carrier Blackman & Associates, P.C.; Joseph P. Carrier; William D. Blackman

(57) ABSTRACT

A weldless connection for connecting two components together, including first and second components having respective first faces which are disposed in flush engagement with each other, and having respective second faces which are planar and are substantially aligned with each other along a same plane, and a plate which is disposed so as to overlap portions of the aligned second faces of the components. One edge of the plate is curved into a hook shape, a recess is formed into the second face of the first component and receives the curved edge of the plate therein for connecting the plate to the first component while permitting some relative movement between the plate and first component, and a portion of the plate which overlaps the second face of the second component is fixed thereto.

13 Claims, 6 Drawing Sheets

(56) References Cited

U.S. PATENT DOCUMENTS

| | | | | |
|---|---|---|---|---|
| 7,503,553 B2* | 3/2009 | Brannan | ................ | B62D 33/10 |
| | | | | 267/248 |
| 7,677,514 B1* | 3/2010 | Palmer | ................ | B60K 15/067 |
| | | | | 248/228.1 |
| 2010/0270819 A1* | 10/2010 | Gustafsson | ............ | B62D 24/02 |
| | | | | 296/29 |
| 2011/0291444 A1* | 12/2011 | Ische | ........................ | B60P 3/42 |
| | | | | 296/193.04 |
| 2015/0233402 A1* | 8/2015 | Hudson | ................. | B62D 27/02 |
| | | | | 24/456 |
| 2017/0217505 A1* | 8/2017 | Zehner | ................... | F16B 7/187 |
| 2018/0057059 A1* | 3/2018 | Bauer | ................. | B62D 29/045 |
| 2018/0194405 A1* | 7/2018 | Hatke | ................... | B62D 24/02 |
| 2018/0244321 A1* | 8/2018 | McCloud | ............... | B62D 21/20 |
| 2019/0047637 A1* | 2/2019 | DeMonte | ........... | B62D 25/2054 |

\* cited by examiner

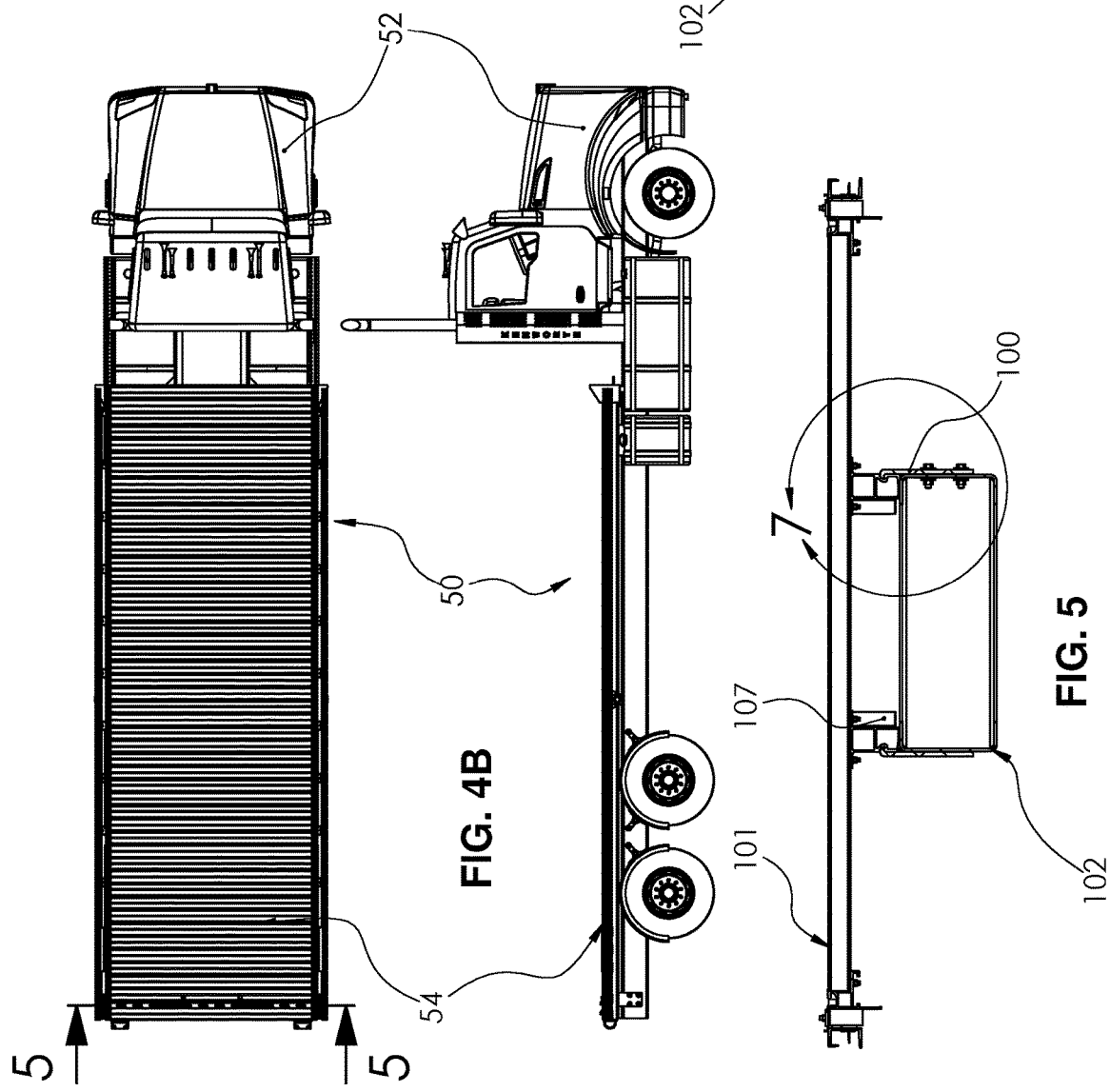
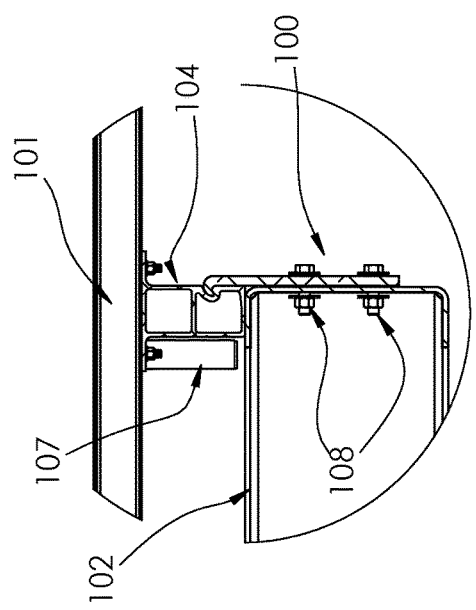

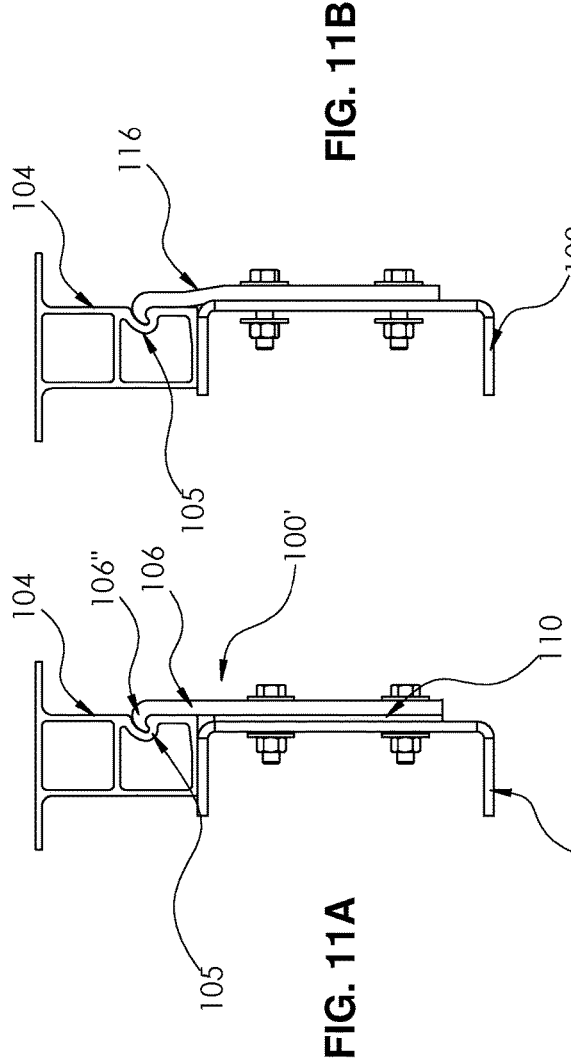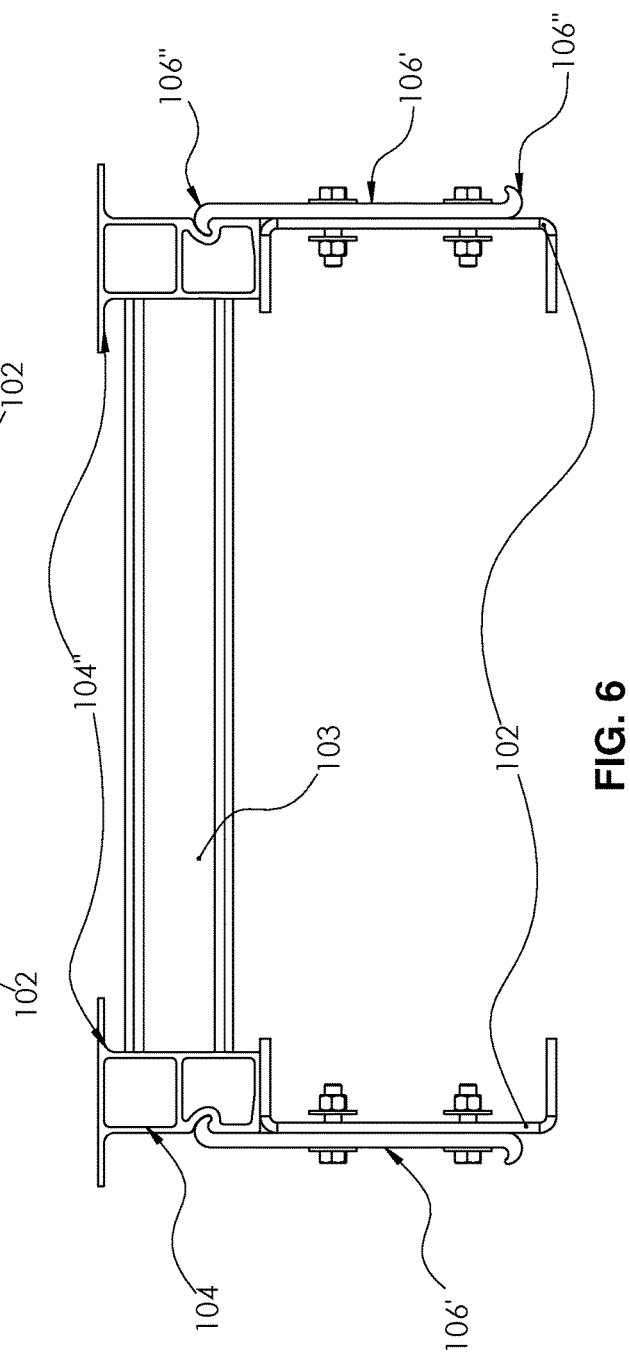

INTERLOCKING WELDLESS CONNECTION FOR METAL COMPONENTS

CROSS REFERENCE TO RELATED APPLICATIONS

The present application claims priority under 35 USC 119(e) based on U.S. Provisional Patent Application Ser. No. 62/544,317, filed 11 Aug. 2017. The entire disclosure of this prior application is incorporated herein by reference.

BACKGROUND OF THE INVENTION

1. Field of the Invention

The present disclosure relates to a novel, interlocking weldless connection for metal components which is more resistant to failure over a long period of time in which the metal components being connected are regularly subjected to significant stress and environmental conditions, such as metal components on vehicle bodies and frames, and components made of different metals which are conventionally difficult to weld together.

2. Background

In the vehicle—truck manufacturing industries, extensive use is made of steel because of its excellent strength and relatively low cost. However, steel is also relatively heavy and there has been significant demand to reduce the weight of vehicles, and doing so typically involves use of materials which are lighter in weight than steel, including metals such as aluminum and aluminum alloys, for making some of the components of the vehicles and trucks. In such situations, it is often necessary to connect steel components to components made of aluminum or aluminum alloys, and this may lead to complications, including difficultly in reliably connecting the components together via welding, welds that fail over time, accelerated corrosion of parts due to sacrificial anode effect, etc.

The present inventors have experienced particular difficulties and reliability problems with joined steel and aluminum components in a trailer, such as the eighteen wheel trailers commonly used as cargo supporting components of semi-trailer trucks for transporting goods over roads in North America and South America. Such a trailer has conventionally included a steel main frame which extends substantially a full longitudinal length of the trailer and a cargo-supporting flatbed disposed above the main frame, comprising a steel flatbed frame and wood boards connected to the flatbed frame. In recent years and for various reasons including weight reduction, however, the cargo-supporting flatbeds of some trailers have been constructed primarily using components formed of aluminum or aluminum alloys. Such components include main sills which are typically supported on the upper surface of the steel main frame and also extend substantially a full length of the trailer, and floor boards which are supported on the upper surfaces of the main sills and extend transversely of the trailer to form a cargo-supporting platform. With such trailers including a steel main frame and main sills formed of aluminum or an aluminum alloy it is necessary to securely connect the aluminum main sills to the steel main frame, and this is where complications arise.

FIGS. 1A, 1B show a conventional connection arrangement in which steel frames 1 and an aluminum main sills 3 of a trailer are connected together using plural large, steel U-bolts 5 which are provided in spaced relation to each other along the longitudinal length of the main frame 1 and the main sill 3. Particularly, FIG. 1A is a rear, upper perspective view of a frame 9 of a flatbed platform of the trailer as supported on the main sills 3, which are in turn supported on the main frames 1, and each of the main sills is connected to an associated one of the main frames using a plurality of the U-bolts 5 which are spaced from each other along the longitudinal length of the frames and sills, and FIG. 1B is an enlarged view of a circled portion of FIG. 1A indicated by arrow B. As shown, each of the U-bolts 5 surrounds and connects one of the main frames and one of the main sill, with the two legs of the U-bolt facing downward, and a connector plate 7 which extends between threaded ends of the two legs below the main sill, and then threaded nuts are attached to the threaded ends of the two legs and are tightened so that the frame and main sill are compressed together. The conventional flatbed platform will also include wooden boards provided on the upper surface of the frame 9, but these are omitted for ease of understanding. A rear bumper 11 is connected to the rear ends of the main frames 1 and the main sills 3, which also functions as a stopper to prevent the main frames and the main sills from moving relative to each other in the longitudinal direction.

While such connection using the U-bolts 5 is initially very effective for connecting the main frame 1 and main sill 3 together, the main frames and main sills are subjected to significant amounts of vibration, bending, twisting, and the like as the trailer is driven over roads, particularly when the trailer is loaded with cargo, and forces associated with same tend to distort and/or collapse the portions of the main frame 1 and main sill 3 which are engaged by the U-bolts 5 over time, particularly the aluminum main sill which is much softer than the steel frame. The distortion of the main frame and main sill causes the U-bolts 5 to become loose, which permits the main frame and main sill to move somewhat relative to each other, and the movement becomes much more pronounced or worse over time unless repairs are made, e.g., further tightening or replacement of the U-bolts 5.

In light of the difficulties and problems with connecting the steel main frames and aluminum main sills using the U-bolts 5 according to conventional practice, the present inventors have proposed other manners of connecting the steel main frames 1 to the aluminum main sills 3. With reference to FIG. 2 of the present application, according to one previous proposal, instead of the U-bolts 5, a plurality of aluminum plates 11 are disposed to overlap aligned side faces of the main frame 1 and the aluminum main sill 3, and in spaced relation to each other along the length of the frame 1 and main sill 3, with a lower portion of each plate 11 being connected to the steel frame via mechanical fasteners 13 such as threaded bolts and nuts, and the upper portion of each plate is connected to the aluminum main sill by welding.

With reference to FIG. 3 of the present application, according to another proposal by the present inventors, instead of the U-bolts 5, a plurality of pairs of brackets 17, 19 which are L-shaped in cross section are used to connect the steel frame 1 and the aluminum main sill 3 together. Again, the pairs of brackets 17, 19 are disposed in spaced relation to each other along the length of the main frame 1 and main sill 3. Each pair of brackets 17, 19 includes one bracket 19 made of steel which is connected to a side face of the steel frame 1 using steel bolts and nuts 21 or other mechanical fasteners and one bracket 17 made of aluminum which is welded to a side face of the main sill 3, and then other mechanical fasteners 23 such as steel bolts and nuts are used to connect opposing faces of the pair of brackets together.

The previous proposals by the present inventors work reasonably well, but these also experience difficulties and problems over time, again, because the main frames 1 and main sills 3 are subjected to significant amounts of stress, vibration, bending, twisting, and the like as the trailer is driven over roads. With the connection shown in FIG. 2 involving the aluminum plates 11, the welds 15 between the aluminum plates 11 and the aluminum main sill 3 tend to crack over time and if not repaired may fail. With the connection shown in FIG. 3 involving the pairs of brackets 17, 19, this has proven to be more reliable and durable than the connection shown in FIG. 2 involving the aluminum plates 11, due in part to the fact that there is some amount of relative movement permitted between the pair of brackets 17, 19 so that less stress is imposed on the welds between the aluminum bracket 17 and the aluminum main sill 3. However, there may be situations in which the welds between the aluminum bracket 17 and the aluminum main sill 3 crack over time and if not repaired may fail.

Thus, the conventional and previously proposed connection arrangements remain to be improved on. There remains in the art a need for a connection arrangement for metal components, including components made of different metals which are conventionally difficult to weld together, which is more resistant to failure over a long period of time, and which is not excessively complex or expensive.

SUMMARY OF THE INVENTION

An object of the present invention is to satisfy the discussed need in the art.

According to a first aspect of the present invention there is provided a weldless connection for connecting two components together, the connection comprising: first and second components which are provided in engagement with each other, wherein each of the components has a planar or substantially planar face and said faces are aligned with each other substantially along a same plane; a plate which is disposed so as overlap portions of the aligned faces of the components, wherein one edge of the plate is curved into a hook shape, a recess is formed into the planar or substantially planar face of the first component and receives the curved edge of the plate therein for connecting the plate to the first component; and at least one mechanical fastener connects a portion of the plate to the second component.

In such weldless connection the first and second components may be respectively formed of different metals such as aluminum or aluminum alloy and steel, the first component may be disposed on an upper surface of the second component, the plate may be formed of aluminum or aluminum alloy and extend substantially perpendicular to the upper surface of the second component, and the first component may be connected to the plate exclusively through the engagement of the curved edge of the plate and the recess formed in the face of the first component.

Such weldless connection according to the first aspect of the present invention is very advantageous over conventionally known connection arrangements, including those shown in present FIGS. 1-3, for several reasons. One reason is that the connection arrangement is structurally non-complicated and may be easily effected by most people, including persons having no special skills, e.g., the plate is engaged to the first component by fitting the curved edge of the plate into the recess of the first component, and then the mechanical fastener such as a steel bolt may be extended through aligned openings defined in the plate and the second component and secured by tightening the fastener.

Another reason is that the connection is very strong and reliable for connecting the first and second components together over a long period of time. Although the plate is connected to the first component only by the engagement between the curved edge of the plate and the recess formed in the face of the first component, the combination of such engagement together with the connection between the plate and the second component via the mechanical fastener and engagement between the first and second components themselves prevents any significant movements between the first and second components even if the first and second components are subjected to significant amounts of vibration, bending and twisting, so that the first and second components remain securely connected together. While the weldless connection permits some relative movements between the first and second components, e.g., via the engagement between the curved edge of the plate and the recess in the face of the first component, these movements are not sufficiently large or significant enough to displace the curved edge from the recess, so that the connection is very durable and reliable. It is important that the weldless connection does not involve any welding between the plate and the first and second components because the welds tend to crack and fail over time, especially if the weld is between two components made of aluminum or an aluminum alloy.

According to a second aspect of the present invention, a trailer comprises a plurality of the weldless connections according to the first aspect which connect an elongate main frame and an elongate main sill of the trailer together, wherein the first component is the elongate main sill of the trailer and is formed of at least one of aluminum and an aluminum alloy, the second component is the elongate main frame of the trailer and is formed of steel, and the plurality of the weldless connections are disposed in spaced relation to each other longitudinally of the main frame and the main sill.

Such trailer according to the second aspect of the present invention may include a pair of the elongate main sills which are disposed on an upper surface of the elongate main frame at opposite lateral sides of the main frame, and the weldless connections connect separately connect the main sills to the main frame.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

BRIEF DESCRIPTION OF THE FIGURES

FIGS. 4A and 4B are, respectively, a top plan view and a side elevational view of a semi-trailer truck in which a steel main frame and a pair of aluminum main sills of the trailer are connected together using plural weldless connections according to an exemplary embodiment of the present invention.

FIG. 5 is an end view looking in a direction of line 5-5 in FIG. 4A showing the weldless connections.

FIG. 6 is a perspective view showing an alternative construction from that shown in FIG. 5 for the steel main frame and the main sills of the trailer, but which includes the same exemplary embodiment of the weldless connection as shown in FIG. 5.

FIG. 7 is an enlarged view of the circled area 7 in FIG. 5 including the weldless connection connecting the steel main frame and one of the aluminum main sills.

FIGS. 11A, 11B are similar to FIG. 8 but show modifications of the exemplary embodiment of the weldless connection shown in FIG. 8.

DETAILED DESCRIPTION OF PRESENT EXEMPLARY EMBODIMENTS

Figure 1:
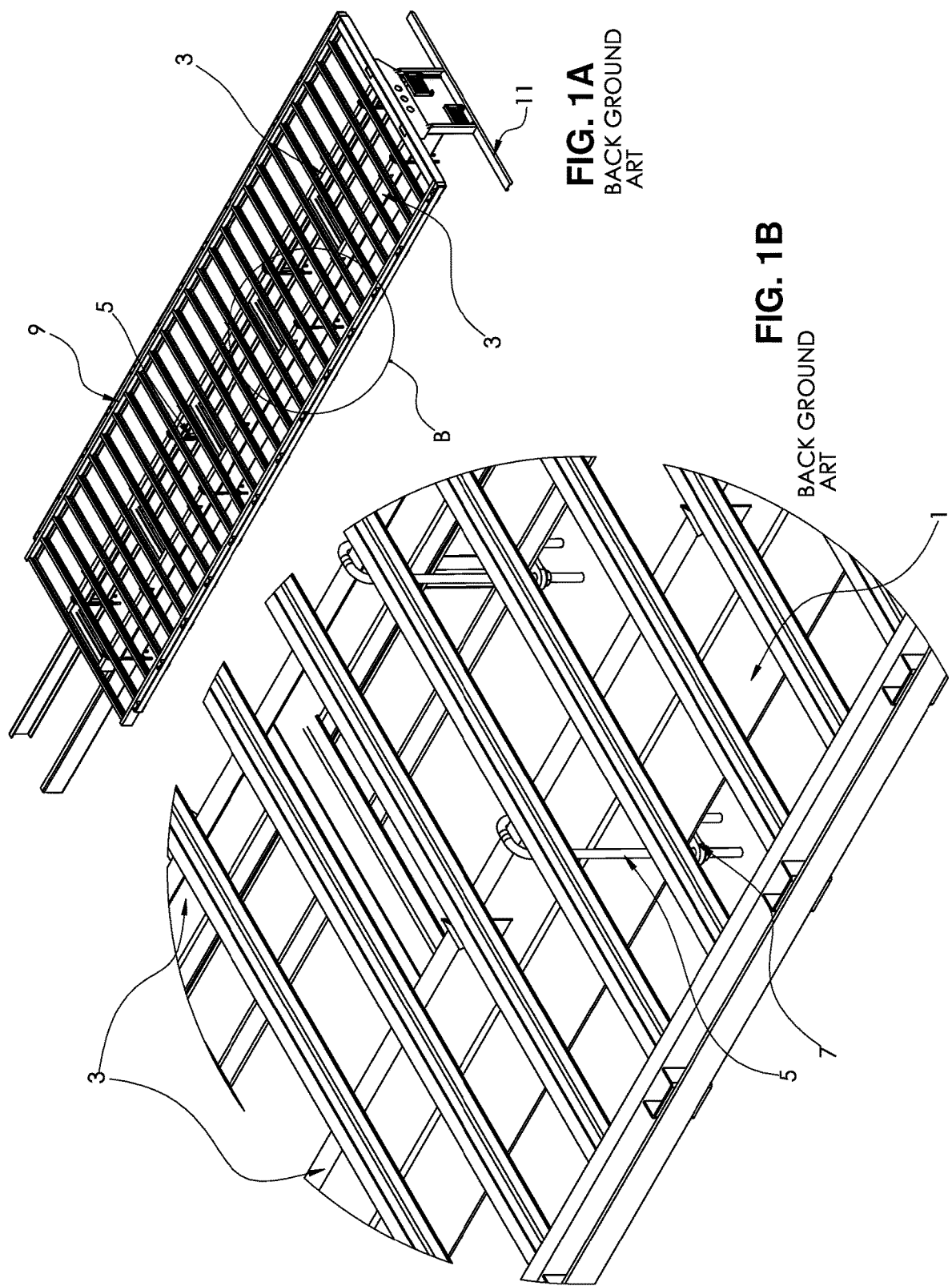
FIG. 1A is a perspective view of a conventional connection between a steel main frame and an aluminum main sill of a trailer involving U-bolts which surround and connect the main frame and main sill.
FIG. 1B is an enlarged view of a circled portion of FIG. 1A indicated by arrow B.
Figure 2:
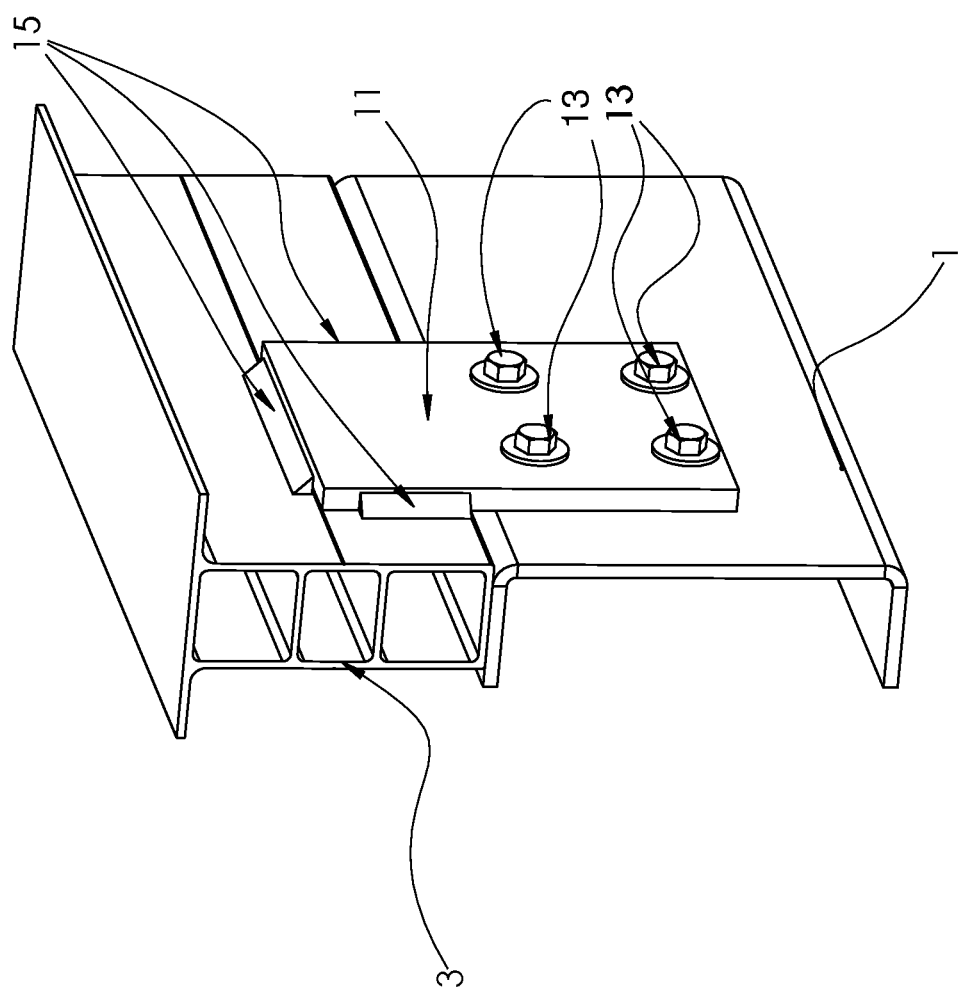
FIG. 2 is a perspective view of a arrangement previously proposed by the present inventors as a connection between a steel main frame and an aluminum main sill of a trailer involving an aluminum or an aluminum alloy plate which is welded to the main sill and bolted to the main frame.
Figure 3:
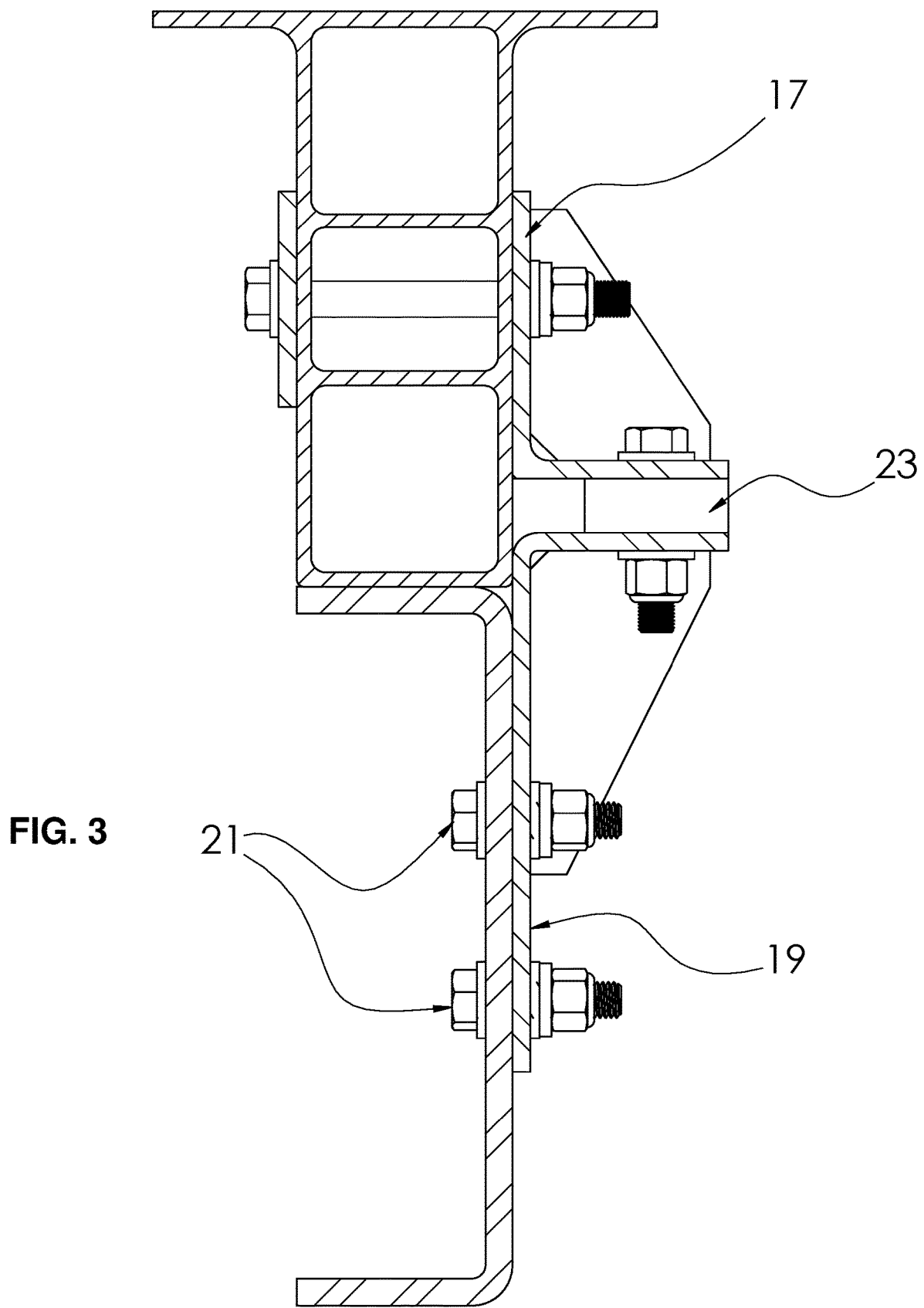
FIG. 3 is an end view of another arrangement previously proposed by the present inventors as a connection between a steel main frame and an aluminum main sill of a trailer involving a pair of steel and aluminum brackets respectively connected to the retain frame and the main sill, and also connected to each other.
Figure 9:
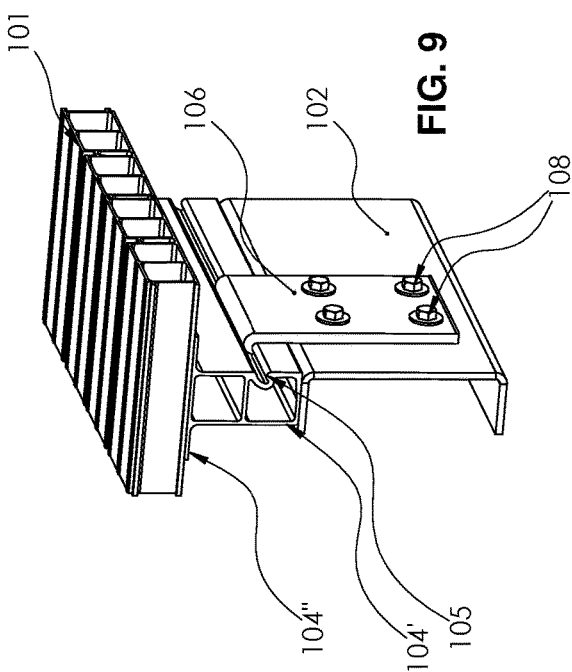
FIG. 9 is a perspective view of the structure shown in FIG. 8.
Figure 10:
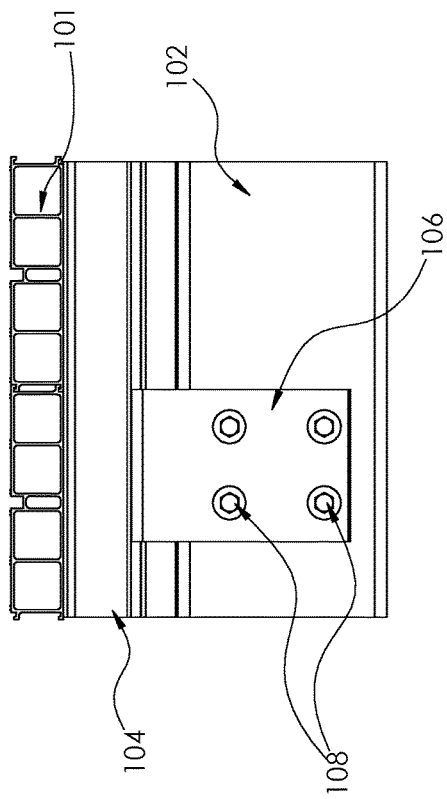
FIG. 10 is a side elevational view of the structure shown in FIG. 8 half of the exemplary embodiment in FIG. 4, which also shows mechanical fasteners forming part of the connection.
Figure 8:
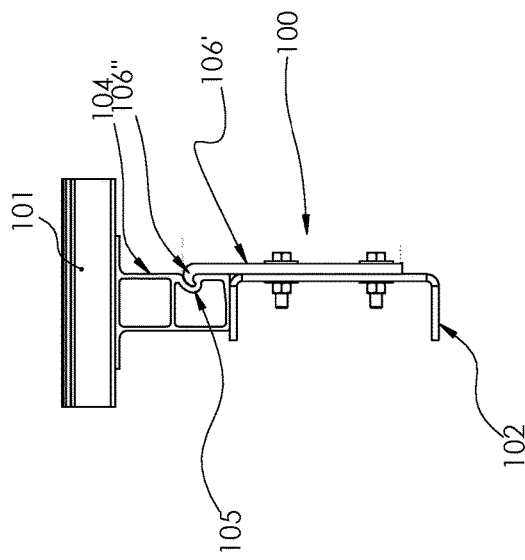
FIG. 8 is a further enlarged view of a portion of FIG. 7 including the weldless connection.

An exemplary embodiment of a weldless connection according to the present invention as used for connecting a steel main frame and a pair of aluminum main sills of a trailer will be described below in relation to FIGS. 4A, 4B, 5 and 7-10. With reference to FIGS. 4A, 4B, 5 and 7-10 there is shown a semi-trailer truck 50 generally including a tractor unit 52 and a trailer 54. The trailer includes a flatbed platform 101 on which cargo may be supported, a main frame 102, a pair of left and right main sills 104 which are disposed on an upper surface of the main frame 102 at opposite lateral sides of the main frame, and a plurality of weldless connections 100 according to an exemplary embodiment of the present invention, which connect the main sills 104 to the main frame 102. Each of the flatbed platform 101, the main frame 102 and the main sills 104 may extend essentially the full longitudinal length of the trailer, while several of the weldless connections 100 may be used to connect each of the main sills to the main frame and may be disposed in spaced relation to each other along the longitudinal length of the main frame. As best shown in FIGS. 4A, 9, 10 the flatbed platform 101 may be constructed using a large number of rectangular, tubular members that may be formed of a metal such as aluminum or an aluminum alloy, may extend laterally of the trailer 54 and be connected together. Such flatbed platform 101 has a substantially planar upper surface on which cargo may be supported and a substantially planar lower surface which is engaged to and supported on the upper surfaces of main sills 104, and has a desirably smaller vertical height and reduced weight in comparison to the conventional trailer flatbed platforms formed using a steel frame 9 and wooded boards such as shown in FIGS. 1A, 1B.

For convenience, the semi-trailer unit 50 is depicted as including the tractor unit 52 having only one wheel on each lateral side thereof and the trailer 54 having only two wheels on each lateral side thereof, but the semi-trailer unit 50 may be of any suitable size and configuration, including the conventional eighteen (18) wheel configuration.

The main frame 102 may be constructed according to conventional practices, e.g., it may be formed of steel and may be closed and substantially rectangular in cross section such as shown in FIG. 5, it could be formed as a pair (left and right) of steel members which are substantially C-shaped in cross section and are spaced from each other in the lateral direction of the trailer as shown in FIG. 6, etc.

The left and right main sills 104 may be formed of aluminum or an aluminum alloy, and may be of any appropriate size and shape for supporting the flatbed platform 101 and for being supported on the main frame 102. For example, the main sills 104 may be 5-10 inches tall and 3-10 inches wide including a projecting flange 104". As depicted, the main sills may have a main body 104' which is substantially rectangular shape with a longer side extending vertically, and the projecting flange 104" extending laterally away from both sides of the upper surface of the main body to form a planar support surface on which the platform bed 101 is supported. Each of the main sills 104 may have a planar lower face which rests on a planar upper face of the steel main frame 102, and at least one side face which is aligned with a side face of the main frame 102 along a substantially vertical plane. The flatbed platform 101 may be connected to the upper surfaces of the main sills 104, including the projecting flange 104", using fasteners such as threaded nuts and bolts (not shown), and the joined structure of the flatbed platform and the main sills 104 is very strong and rigid, whereby the main sills do not require any reinforcing members. If desired, however, it is possible that the main sills 104 may be reinforced, e.g., by using one or more cross members 103 which is/are connected between the left and right main sills as in the alternative construction shown in FIG. 6. The members 103 may be formed of the same material as the main sills.

With reference to FIGS. 5 and 7-10, the weldless connection 100 according to this exemplary embodiment may include a plate 106 which is disposed to overlap portions of the aligned faces of the main frame 102 and main sill 104 along the vertical plane, with an upper end-edge being formed into a hook shape 106" that operatively engages a recess 105 formed in a side surface of the main sill 104 and a lower portion which may be connected to the main frame 102 using one or more mechanical fasteners 108 such as threaded bolts with mating, threaded nuts or any other appropriate mechanical fasteners including steel rivets. In the depicted embodiment, the lower portion of the plate 106 be connected to the steel frame using four mechanical fasteners 108 but any appropriate number could be used. Alternatively or additionally, the plate 106 could be connected to the frame 102 by other appropriate means, including welding or adhesive bonding. In FIG. 5 only the right side weldless connection 100 is depicted as being connected to the main frame 102 using fasteners 108, but in use the left side weldless connection 100 would be similarly connected to the main frame 102.

The plate 106 may be formed of aluminum or an aluminum alloy, or any other appropriate material including other metals such as steel, and may be of sufficient size and thickness as needed for any given application. In the depicted embodiment where the weldless connection connects the main frame 102 and main sill 104 of the trailer 54, the plate 106 may, for example, be 4-10 inches tall, 0.25-1.0 inch thick, and any desired width, such as 10-30 cm, in the longitudinal direction of the trailer. Throughout this disclosure the term "aluminum" is used to indicate either aluminum or an aluminum alloy. Generally, the main frame 102 and main sill 104 are subjected to significant amounts of stress, vibration, bending and twisting, and the like as the trailer is driven over roads, so that the plate 106 must be made of sufficiently strong and rigid materials to withstand such forces. However, the weldless connection according to the present invention is not limited for use in connecting a steel frame and aluminum main sill of a trailer. In other applications, it may be suitable to form the plate 106 of materials such as plastics and reinforced plastics.

Again, the plate 106 may have at least one end-edge 106" curved into a hook shape which snugly fits into a recess 105 formed into the vertically extending face of the main sill 104 so that the plate 106 and main 104 sill are connected together through the engagement of the curved edge 106" and the recess 105, as shown in FIGS. 5 and 7-10. With reference to FIG. 6, a weldless connection 100' depicted therein includes a plate 106' having a modified construction in comparison to the plate 106 in FIGS. 5 and 7-10 in that the plate 106' has opposite ends thereof which are formed into a hook shape 106", such that the plate 106' is symmetric and reversible, whereas the plate 106 is hook-shaped in cross section at only one end thereof and is not reversible. The reversibility of the modified plate 106' of FIG. 6 is advantageous to prolong the useful life of the plate 106', e.g., if one of the curved edges 106" engaged with the recess 105 becomes damaged over time, the plate 106' may be removed, flipped 180° so that the other curved edge 106' is engaged with the recess 105 and resecured to the steel frame 102.

In the depicted embodiment of FIGS. 5 and 7-10 a lower portion of the plate 106 extends to overlap substantially the full height of the side wall of the main frame 102 and is connected thereto using four of the mechanical fasteners 108 for a secure connection, while the upper portion of the plate overlaps a lower portion of the vertical side wall of the main sill 104 which is sufficient for stably connecting the curved edge 106" of the plate in the recess 105 formed in the side wall. It is, of course, possible for the lower portion of the plate 106 to overlap less that the full height of the frame wall, and for the upper portion of the plate to overlap more or substantially all of the full height of the main sill wall. Additionally, the plate 106 may have thickness which is at least as great as a wall of the steel main frame 012 or the side wall of the main sill 104 to assure sufficient strength and rigidity.

With reference to FIGS. 11A, 11B, there are shown two modifications to the weldless connection 100 of FIGS. 5 and 7-10. In the modification of FIG. 11A the weldless connection 100' additionally includes a spacer 110 disposed between the plate 106 and the side wall of the main frame 102 that are being joined. Such spacer may be formed of various materials, including metals such as aluminum and steel, plastic, etc., and may achieve various functions. For example, if the main sill 104 extends farther in the transverse direction of the trailer than does the main frame 102 by a slight distance and the plate 106 is planar, this may be undesirable in that there would likely be a gap between some portion of the plate 106 and the main frame 102 in the weldless connection 100 and this could weaken the connection and/or lead to premature failure of the connection. However, by providing the spacer 110 having a thickness substantially equal to the slight distance by which the main sill 104 extends further in the transverse direction between the plate 106 and the main frame 102, the side wall of the main sill 104 will extend along the same vertical plane as the laterally outside surface of the spacer 110, and the plate 106 will flushly contact the spacer with no gaps therebetween. Further, if the spacer 110 is formed of a material which is electrically insulating such as plastic, or has an electrically insulating coating provided on a surface thereof, this would help to prevent any corrosion of the engaged surfaces of the plate 106 and/or the main frame 102, such as might otherwise occur.

In the modified weldless connection 100" of FIG. 11B, an upper portion of the plate 116 is offset by a slight distance inwardly in the transverse direction of the trailer so as to compensate for a corresponding slight distance by which the side wall of the main sill 104 extends inwardly of the side wall of the main frame 102 in the transverse direction of the trailer, so that there will be no gaps formed between the plate 116 and either of the main sill 104 and the main frame 102 in the weldless connection. Again, and such gaps are undesirable because they could weaken the connection and/or lead to premature failure of the connection.

The trailer 54 may also include a rear bumper which is connected to the main frame 102 and the main sills 104 to prevent them from moving relative to each other in the longitudinal direction, such as the bumper 11 of the conventional arrangement shown in FIG. 1A, or may include some other structure for achieving such purpose. For example, the plate 106 and/or the main sill may be provided with some type of stop which would restrict or prevent relative longitudinal movement between the plate 106 and the main sill 102. For example the curved edge 106" of the plate 106 may be provided with a small projection (not shown) that extends into a small opening or sub-recess formed in the recess 105 defined in the main sill side wall.

The weldless connection 100 according to the exemplary embodiment is very strong and reliable for connecting the steel main frame 102 and the aluminum main sills 104 of the trailer 54 together. Although the plate 106 is connected to the main sill 104 only by the engagement between the curved edge-end 106" of the plate and the recess 105 formed in the wall of the main sill, the combination of such engagement together with the connection between the plate 106 and the main frame 102 via the fasteners 108 and/or other means, and the engagement between the steel frame and main sill themselves prevents any significant movements between the main frame and main sill even if the main frame and main sill are subjected to significant amounts of stress, vibration, bending and twisting, so that main frame and main sill are securely connected together. While the weldless connection permits some relative movements between the main frame and main sill, e.g., via the engagement between the curved edge 106" of the plate 106 and the recess 105 in the side wall of the main sill 104, these movements are not large or significant enough to displace the curved edge from the recess, so that the connection is very durable and reliable. Also, because two of the main sills 104 are being connected to the main frame at opposite lateral portions of the main frame using the weldless connections 100 according to the exemplary embodiment of the present invention, this helps to minimize rotational movement of the flatbed platform 101 in either lateral direction, and correspondingly minimizes and relative movement between the curved edges 106″ of the plates 106 and the recesses 105 in the side walls of the main sills 104.

While the connection between the plate 106 and the main frame may involve welding, it is desirable that the weldless connection 100 does not involve any welding between the plate 106 and either of the main frame 102 and main sill 104 because the welds tend to crack and fail over time, especially if the weld is between two components made of aluminum or an aluminum alloy.

As will be recognized, the connection 100 is advantageously not structurally complicated, and may be easily effected by anyone, even persons having no special skills. For example, the plate 106 may be engaged to the main sill 104 by fitting the curved edge 106″ of the plate into the recess 105 of the main sill, then the mechanical fasteners 108 such as threaded steel bolts may be extended through aligned openings, which are preformed and/or concurrently formed, in the plate 106 and the steel frame 102, and secured by tightening threaded nuts onto the steel bolts. This process would then be repeated for as many of the weldless connections 100 as are need for connecting the main frame and the main sill along their full longitudinal lengths.

The foregoing description involving a present exemplary embodiment of the weldless connection 100 for connecting the steel main frame 102 and aluminum main sill 104 of a trailer is given for clearness of understanding only, and no unnecessary limitations should be understood therefrom, as modifications within the scope of the invention may be apparent to those having ordinary skill in the art and are encompassed within the scope of the invention. For example, while the exemplary embodiment involves joining of the steel frame 102 and aluminum/aluminum alloy main sill 104 of a tractor trailer, the weldless connection according to the present invention is not limited to this particular application, and may be used for joining together other parts in other applications, such as joining various components of a vehicle to a frame or vehicle body of the vehicle, e.g., connecting suspension components to a vehicle frame, or in other applications not involving a vehicle. As another example, the connection according to the present invention could optionally include use of an adhesive for bonding the plate 106 to either of the steel frame 102 and the main sill 104. Still further, and as discussed above, while the plate 106 in the exemplary embodiment is formed of aluminum or an aluminum alloy it could be formed of other materials such as steel, plastic or reinforced plastic depending on the particular application in which the weldless connection is to be used. Additionally, while the connection according to the present invention is particularly useful for connecting metal components together, it could be used for connecting components made of materials besides metals, such as thermoplastics, thermosetting plastics and reinforced plastics. All of such modifications are intended to be encompassed by the present invention.

We claim:

1. A weldless connection for connecting two components together, the connection comprising:
   first and second components including respective first faces which are disposed in flush engagement with each other, and including respective second faces which are planar or substantially planar and are substantially aligned with each other along a same plane; and
   a plate which is disposed so as overlap portions of the aligned second faces of the components, wherein
   one edge of the plate is curved into a hook shape,
   a recess is formed into the second face of the first component and receives the curved edge of the plate therein for connecting the plate to the first component while permitting some relative movement between the plate and first component, and
   a portion of the plate which overlaps the second face of the second component is fixed thereto.

2. The weldless connection according to claim 1, wherein the first component is formed of aluminum or an aluminum alloy, the second component is formed of steel and the plate is formed of aluminum or an aluminum alloy.

3. The weldless connection according to claim 2, further comprising at least one mechanical fastener which connects the plate to the second face of the second component.

4. The weldless connection according to claim 1, wherein the first and second components are elongate members and the first component is disposed on the second component.

5. The weldless connection according to claim 1, wherein the first and second faces of the first component extend substantially perpendicular to each other and the first and second faces of the second component extend substantially perpendicular to each other.

6. The weldless connection according to claim 1, wherein the first component is connected to the plate exclusively through the engagement of the curved edge of the plate and the recess formed in the second face of the first component, and the first component is connected to the second component exclusively via the plate.

7. A trailer comprising: an elongate main frame and an elongate main sill which is disposed on the main frame such that respective first faces of the main frame and the main sill are disposed in flush engagement with each other, and such that respective second faces of the main frame and the main sill, which are planar or substantially planar, are substantially aligned with each other along a vertical plane; and
   a plate which is disposed so as overlap portions of the aligned second faces of the main frame and the main sill, wherein
   one edge of the plate is curved into a hook shape,
   a recess is formed into the second face of the main sill and receives the curved edge of the plate therein for connecting the plate to the main sill while permitting some relative movement between the plate and main sill, and
   a portion of the plate which overlaps the second face of the main frame is fixed thereto.

8. The trailer according to claim 7, wherein the main sill is formed of aluminum or an aluminum alloy, the main frame is formed of steel and the plate is formed of aluminum or an aluminum alloy.

9. The trailer according to claim 8, further comprising at least one mechanical fastener which connects the plate to the second face of the main frame.

10. The trailer according to claim 7, wherein the first and second faces of the main sill extend substantially perpendicular to each other and the first and second faces of the main frame extend substantially perpendicular to each other.

11. The trailer according to claim 7, wherein the main sill is connected to the plate exclusively through the engagement of the curved edge of the plate and the recess formed in the second face of the main sill, and the main sill is connected to the main frame exclusively via the plate.

12. The trailer according to claim 7, wherein the recess including more than one said plate formed into the second face of the main sill extends along a longitudinal length of the main sill, and the trailer includes more than one said plate disposed in spaced relation to each other along the longitudinal length of the main sill and connecting different portions of the aligned second faces of the main frame and the main sill together.

13. The trailer according to claim 7, comprising a second said elongate main sill and a second said plate, the main sills are disposed on the elongate main frame at an opposite lateral sides of the main frame, and the plates separately connect the main sills to the main frame.

* * * * *